(12) United States Patent
Seiger et al.

(10) Patent No.: US 12,465,454 B2
(45) Date of Patent: Nov. 11, 2025

(54) METHODS OF REPROCESSING A SURGICAL INSTRUMENT AND CORRESPONDING REPROCESSED SURGICAL INSTRUMENTS

(71) Applicant: STRYKER SUSTAINABILITY SOLUTIONS, INC., Tempe, AZ (US)

(72) Inventors: Jason Seiger, Gilbert, AZ (US); Nathan Butters, Phoenix, AZ (US); Nicholas Ferentheil, Gilbert, AZ (US)

(73) Assignee: STRYKER SUSTAINABILITY SOLUTIONS, INC., Tempe, AZ (US)

( * ) Notice: Subject to any disclaimer, the term of this patent is extended or adjusted under 35 U.S.C. 154(b) by 423 days.

(21) Appl. No.: 17/836,589

(22) Filed: Jun. 9, 2022

(65) Prior Publication Data
US 2022/0395351 A1    Dec. 15, 2022

Related U.S. Application Data

(60) Provisional application No. 63/208,666, filed on Jun. 9, 2021.

(51) Int. Cl.
*A61B 90/70* (2016.01)
*A61B 17/00* (2006.01)

(52) U.S. Cl.
CPC ............ *A61B 90/70* (2016.02); *A61B 17/00* (2013.01); *A61B 2017/00477* (2013.01)

(58) Field of Classification Search
CPC .. A61B 90/70; A61B 17/00; A61B 2090/0813
See application file for complete search history.

(56) References Cited

U.S. PATENT DOCUMENTS

| | | | |
|---|---|---|---|
| 9,924,897 | B1 | 3/2018 | Abdul-Hafiz |
| 10,780,544 | B2 | 9/2020 | Twomey et al. |
| 11,007,000 | B2 | 5/2021 | Deborski et al. |
| 2012/0253329 | A1* | 10/2012 | Zemlok ............... A61B 17/072 606/1 |
| 2019/0008543 | A1 | 1/2019 | Scoggins et al. |
| 2019/0321094 | A1* | 10/2019 | Stamm ............... A61B 18/1445 |
| 2020/0337760 | A1 | 10/2020 | Kumar et al. |
| 2020/0338370 | A1* | 10/2020 | Wiener .................... A61N 7/00 |

FOREIGN PATENT DOCUMENTS

EP     3730082 A1 *  10/2020    ......... A61B 18/1445

OTHER PUBLICATIONS

Association of Medical Device Reprocessors (AMDR), "Webpage", http://amdr.org/about-reprocessing/, 2022, 2 pages.
Cardiovascular Systems, Inc., "Diamondback 360 Peripheral Orbital Atherectomy System Webpage", https://csi360.com/diamondback-peripheral-orbital-atherectomy-system/, 2017-present, 9 pages.

* cited by examiner

*Primary Examiner* — Daniel Mcnally
(74) *Attorney, Agent, or Firm* — Howard & Howard Attorneys PLLC

(57) ABSTRACT

Methods and devices for reprocessing a surgical instrument are disclosed. The surgical instrument includes a housing defining a cavity and at least one interior component disposed within the cavity. The housing is opened along a seam to access the cavity, the at least one interior component is serviced, and a mating member is applied to the housing. The housing is joined together with the mating member, and the housing is reopened along the seam to access the cavity.

10 Claims, 15 Drawing Sheets

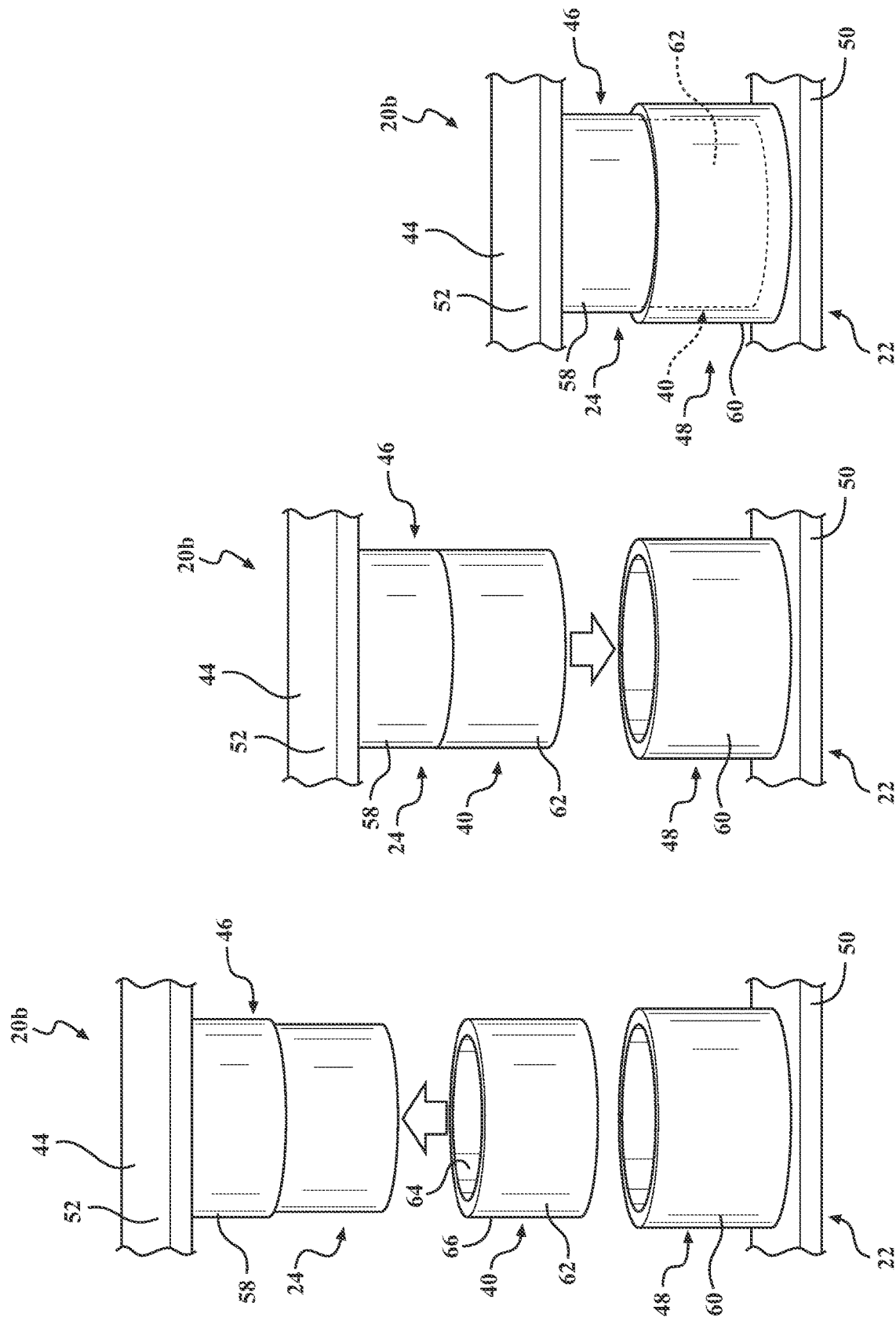

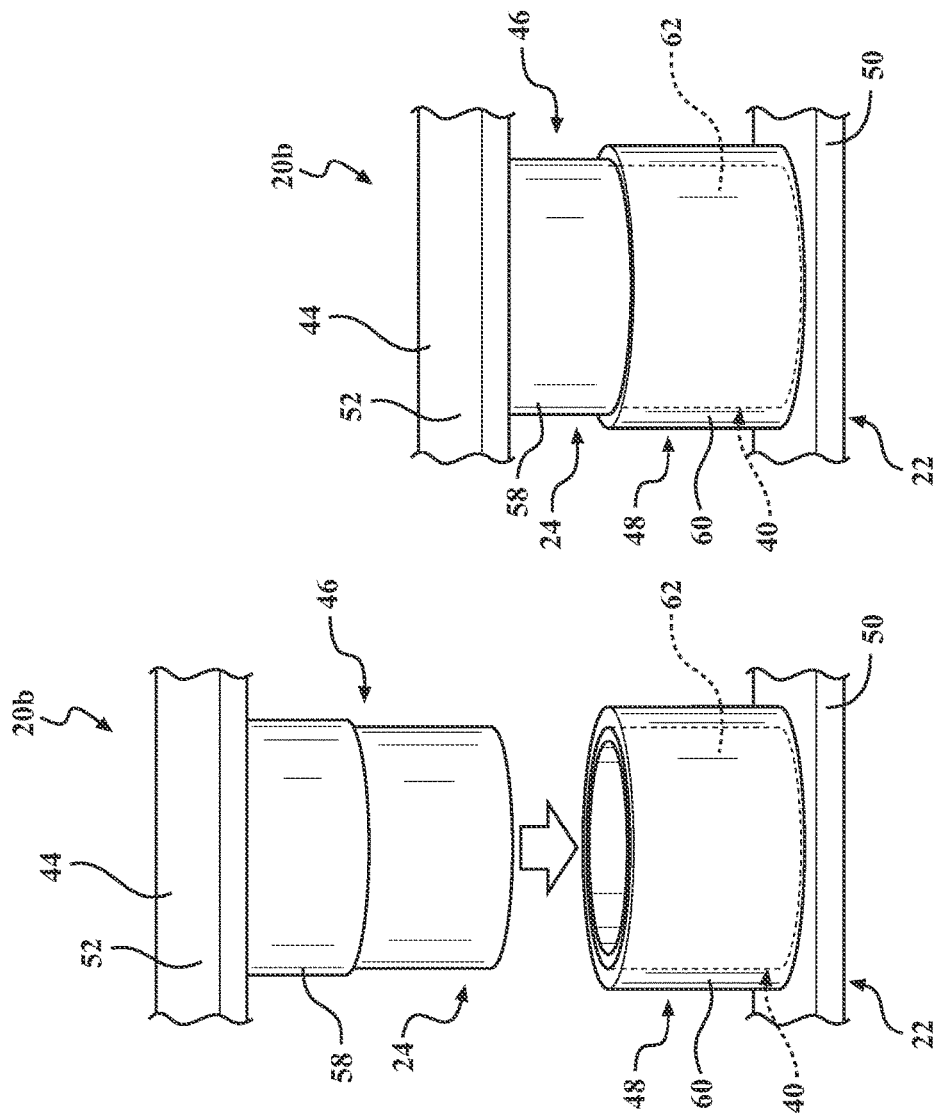
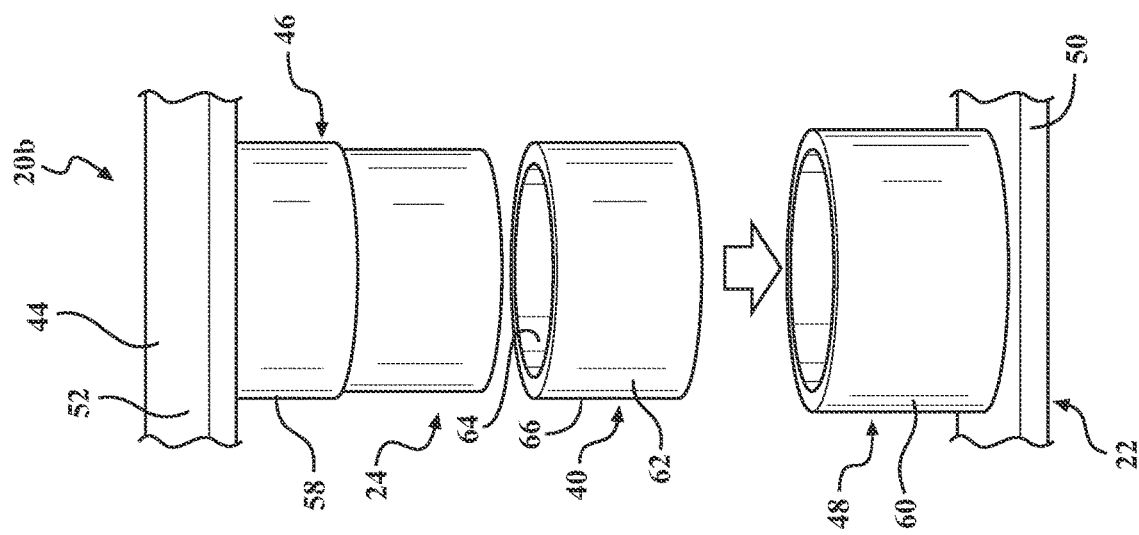

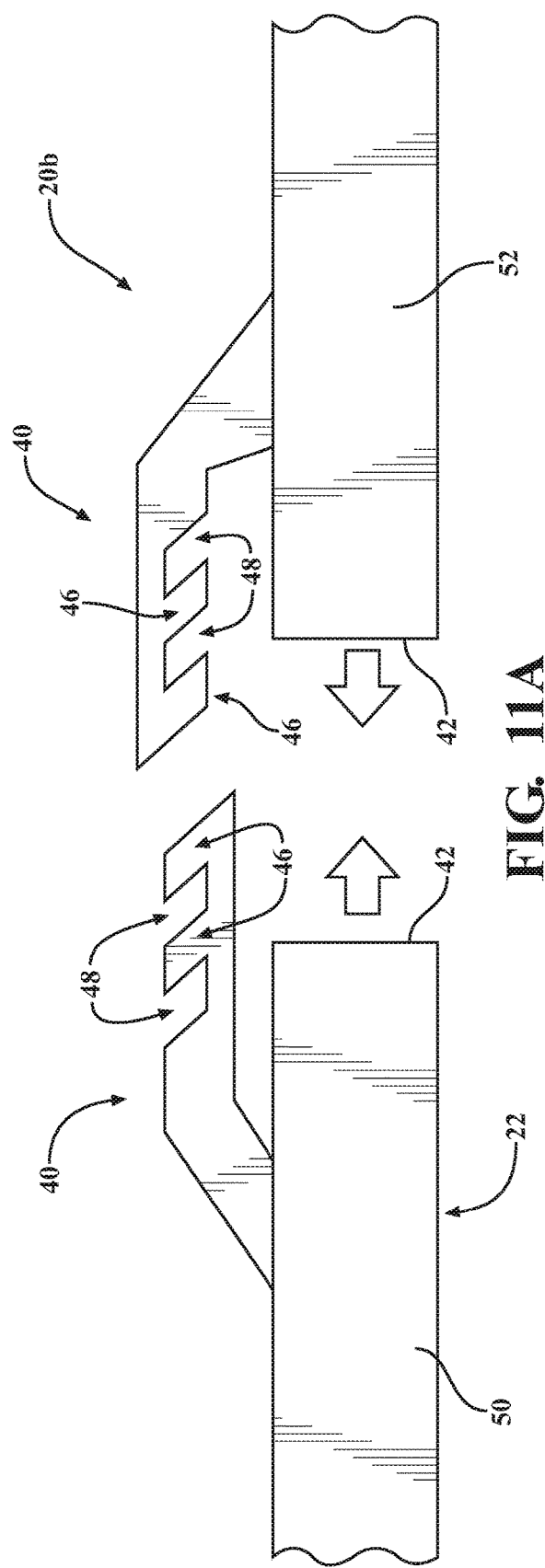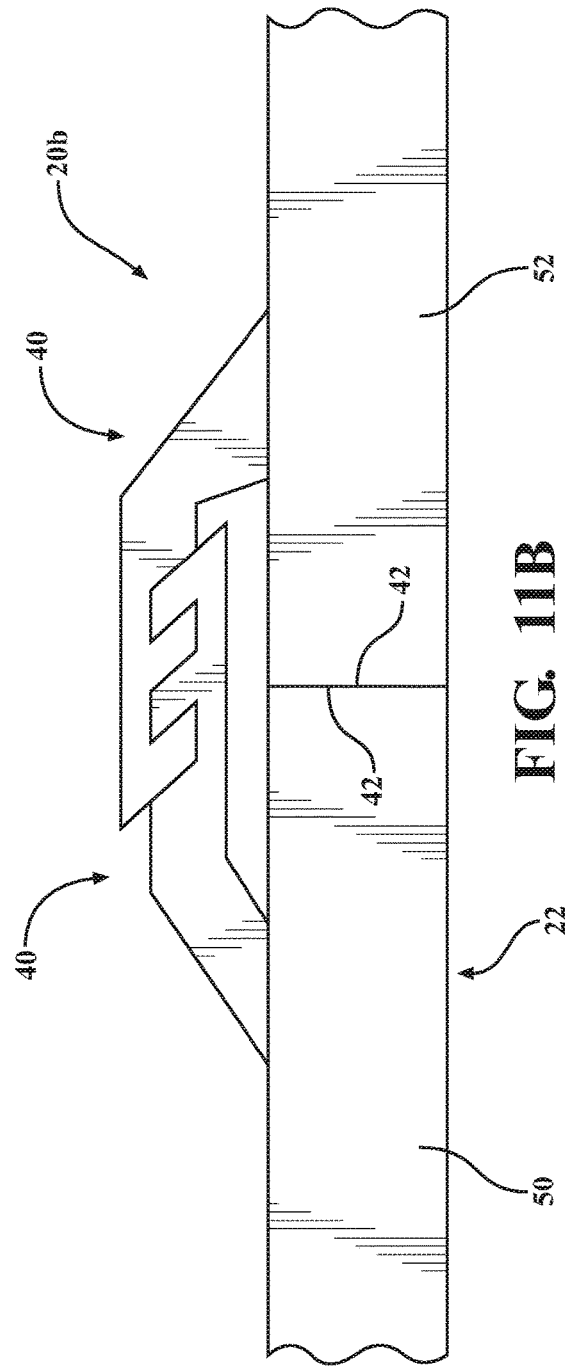

METHODS OF REPROCESSING A SURGICAL INSTRUMENT AND CORRESPONDING REPROCESSED SURGICAL INSTRUMENTS

CROSS REFERENCE TO RELATED APPLICATIONS

This application claims priority to U.S. Provisional Application No. 63/208,666, filed Jun. 9, 2021, the contents of which are hereby incorporated by reference herein in their entirety.

BACKGROUND

It is known that medical practitioners have found it useful to use surgical instruments to assist in the performance of surgical procedures. A surgical instrument is designed to be applied to a surgical site on the patient. The practitioner is able to position the surgical instrument at the site on the patient at which the instrument is to perform a medical or surgical procedure.

Generally, during the original assembly of the surgical instrument, interior components are placed within a cavity of a housing and the housing is closed along one or more seams. The housing is joined along the seams to resist opening along the seams to prevent easy (more specifically, inadvertent) disassembly of the surgical instrument, which is generally undesired. The housing may be joined to resist opening along the seams by mechanical fasteners, friction interfaces, chemical bonding, welding, and the like. However, using the surgical instrument causes wear and tear on the interior components, which in turn can cause the surgical instrument to operate unreliably or become inoperable. Opening the housing along the seams to access and service the worn interior components disposed within the cavity damages the fastening means originally used to keep the housing closed along the seams.

Methods, devices, and surgical instruments that overcome these challenges are desired.

SUMMARY

A first aspect of the present disclosure is directed to a method of reprocessing a surgical instrument comprising a housing defining a cavity and at least one interior component disposed within the cavity. The method comprises the steps of opening the housing along a seam to access the cavity, servicing the at least one interior component, and applying a mating member to the housing. The method further comprises the steps of joining together the housing with the mating member, and reopening the housing along the seam to access the cavity.

In certain implementations the seam is defined by a pair of opposing edges, the step of opening the housing comprises moving the pair of opposing edges away from one another and the step of joining together the housing comprises moving the pair of opposing edges toward one another. The step of joining together the housing may comprise moving the pair of opposing edges toward one another and into abutment with one another. The step of applying the mating member may comprise applying the mating member to the housing adjacent at least one of the pair of opposing edges. The step of applying the mating member may comprise securing a protrusion on the housing adjacent one of the pair of opposing edges and a receptacle for receiving the protrusion on the housing adjacent the other one of the pair of opposing edges. The step of joining together the housing with the mating member may comprise inserting the protrusion into the receptacle to join together the housing. The mating member may comprise a pre-formed wire and an adhesive disposed on the pre-formed wire. The step of applying the mating member to the housing may comprise the step of disposing the pre-formed wire along one of the pair of opposing edges. The step of joining together the housing with the mating member may comprise the step of bonding the adhesive to the housing along both of the pair of opposing edges to join together the housing.

In certain implementations the housing comprises at least first and second portions movable independent of one another, with the step of opening the housing comprising moving the first and second portions away from one another and the step of joining together the housing comprising moving the first and second portions toward one another. The step of applying the mating member may comprise applying the mating member to at least one of the first and second portions. The step of applying the mating member may further comprise securing a protrusion on one of the first and second portions and a receptacle for receiving the protrusion on the other one of the first and second portions. The step of joining together the housing with the mating member may comprise inserting the protrusion into the receptacle to join the first portion to the second portion. The housing may further comprise a pin disposed on one of the first and second portions and a pocket disposed on the other one of the first and second portions and arranged to receive the pin. The mating member may comprise a sleeve having an annular configuration defining an inner surface sized to press-fit onto the pin and an outer surface sized to press-fit into the pocket. The step of applying a mating member to the housing may comprise the step of securing the sleeve to one of the pin and the pocket. The step of joining together the housing with the mating member may comprise securing the sleeve with the other one of the pin and the pocket to join together the first and second portions. Each of the first and second portions may define a bore longitudinally aligned with one another. The mating member may comprise a stud having an outer surface sized to press-fit into both of the bores of the first and second portions. The step of applying a mating member to the housing may comprise the step of press fitting the stud into the bore of one of the first and second portions. The step of joining together the housing with the mating member may comprise the step of press fitting the stud into the bore of the other one of the first and second portions to join together the first and second portions.

In certain implementations the method further includes a step of presenting the housing that is welded together at the seam, prior to the step of opening the housing along the seam to access the cavity. The step of servicing the at least one interior component may comprise cleaning the at least one interior component. The step of servicing the at least one interior component may comprise replacing the at least one interior component. The step of servicing the at least one interior component may comprise repairing the at least one interior component. The interior component may comprise at least one of a trigger, a drive assembly, a gear, a shaft, and a slider. In certain implementations, the step of applying the mating member to the housing comprises the step of applying the mating member to the housing adjacent the seam.

A second aspect of the present disclosure is directed to a reprocessed surgical instrument comprising a housing defining a cavity, the housing comprising at least first and second portions movable independent of one another, with each of the first and second portions defining an edge abuttable with one another to define a seam. The instrument further comprises a serviced interior component disposed within the cavity and a mating member applied to the housing for joining the first and second portions around the serviced interior component. In some implementations, the mating member comprises a pre-formed wire disposed along the entire edge of the first and/or second portions and an adhesive disposed on the pre-formed wire and bonded to both of the first and second portions to join together the first and second portions.

In some implementations, the housing further comprises a pin disposed on one of the first and second portions and a pocket disposed on the other one of the first and second portions and arranged to receive the pin. The mating member comprises a sleeve defining an inner surface sized to press-fit onto the pin and an outer surface sized to press-fit into the pocket to join together the first and second portions.

In certain implementations the sleeve has an annular configuration.

In some implementations, each of the first and second portions define a bore longitudinally aligned with one another. The mating member comprises a stud having an outer surface sized to press-fit into both of the bores of the first and second portions to join together the first and second portions.

In certain implementations the stud has a cylindrical configuration.

A third aspect of the present disclosure is directed to a method of reprocessing a surgical instrument comprising a housing defining a cavity and at least one interior component disposed within the cavity. The method comprises the steps of: opening the housing along a seam to separate the housing into a first housing component and a second housing component and access the cavity; servicing the at least one interior component; applying a mating member to at least one of the first housing component and the second housing component; and coupling the first housing component and the second housing component with the mating member after the step of servicing.

BRIEF DESCRIPTION OF THE DRAWINGS

FIG. 8A is a perspective view of the pin and the pocket separated from one another prior to the assembly of the reprocessed surgical instrument, with a mating member configured as a sleeve and disposed therebetween.

FIG. 8B is a perspective view of the pin and the pocket separated from one another prior to the assembly of the reprocessed surgical instrument, with the sleeve disposed on the pin.

FIG. 8C is a perspective view of the sleeve inserted into the pocket after the assembly of the reprocessed surgical instrument.

FIG. 9A is a perspective view of the pin and the pocket separated from one another prior to the assembly of the reprocessed surgical instrument, with the sleeve disposed therebetween.

FIG. 9B is a perspective view of the pin and the pocket separated from one another prior to the assembly of the reprocessed surgical instrument, with the sleeve disposed in the pocket.

FIG. 9C is a perspective view of the pin inserted into the sleeve after the assembly of the reprocessed surgical instrument.

FIG. 11A is an elevational view of two mating members separated from one another prior to the assembly of the reprocessed surgical instrument, with the mating members each having a plurality of protrusions configured as teeth and a plurality of receptacles configured as valleys between the teeth.

FIG. 11B is an elevational view of the two mating members of FIG. 11A after assembly of the reprocessed surgical instrument, with the teeth disposed in the opposing valleys.

DETAILED DESCRIPTION

Figure 1:
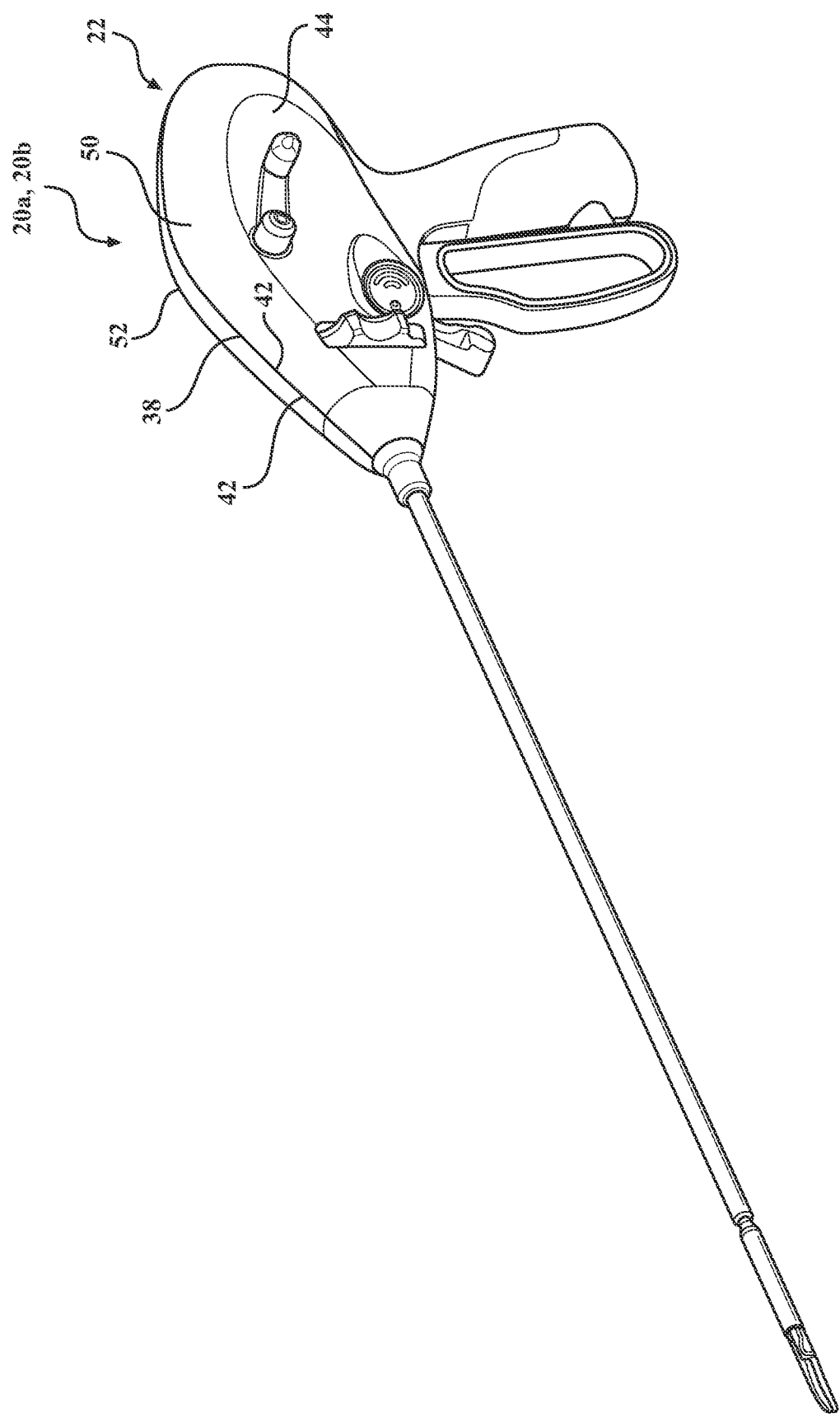
FIG. 1 is a perspective view of a surgical instrument showing a housing having first and second portions joined at a seam.

Referring to FIG. 1, a surgical instrument is shown at 20a and is used in a medical procedure for treating a patient (not shown). In the example shown in FIG. 1, the surgical instrument 20a may be configured to operate in both a bipolar mode, e.g., for grasping, treating, and/or mechanically dissecting tissue, and a monopolar mode, e.g., for treating and/or electrically/electromechanically dissecting tissue. Alternatively, the surgical instrument 20a may be configured to abrade and resect bone and tissue, such as during endoscopic sinus surgery. The surgical instrument 20a may also be adapted for other medical procedures, including but not limited to, spinal, neuro, and endoscopic applications. It should be appreciated that the surgical instrument 20a may be operated by a user (not shown) such as a surgeon.

Figure 2:
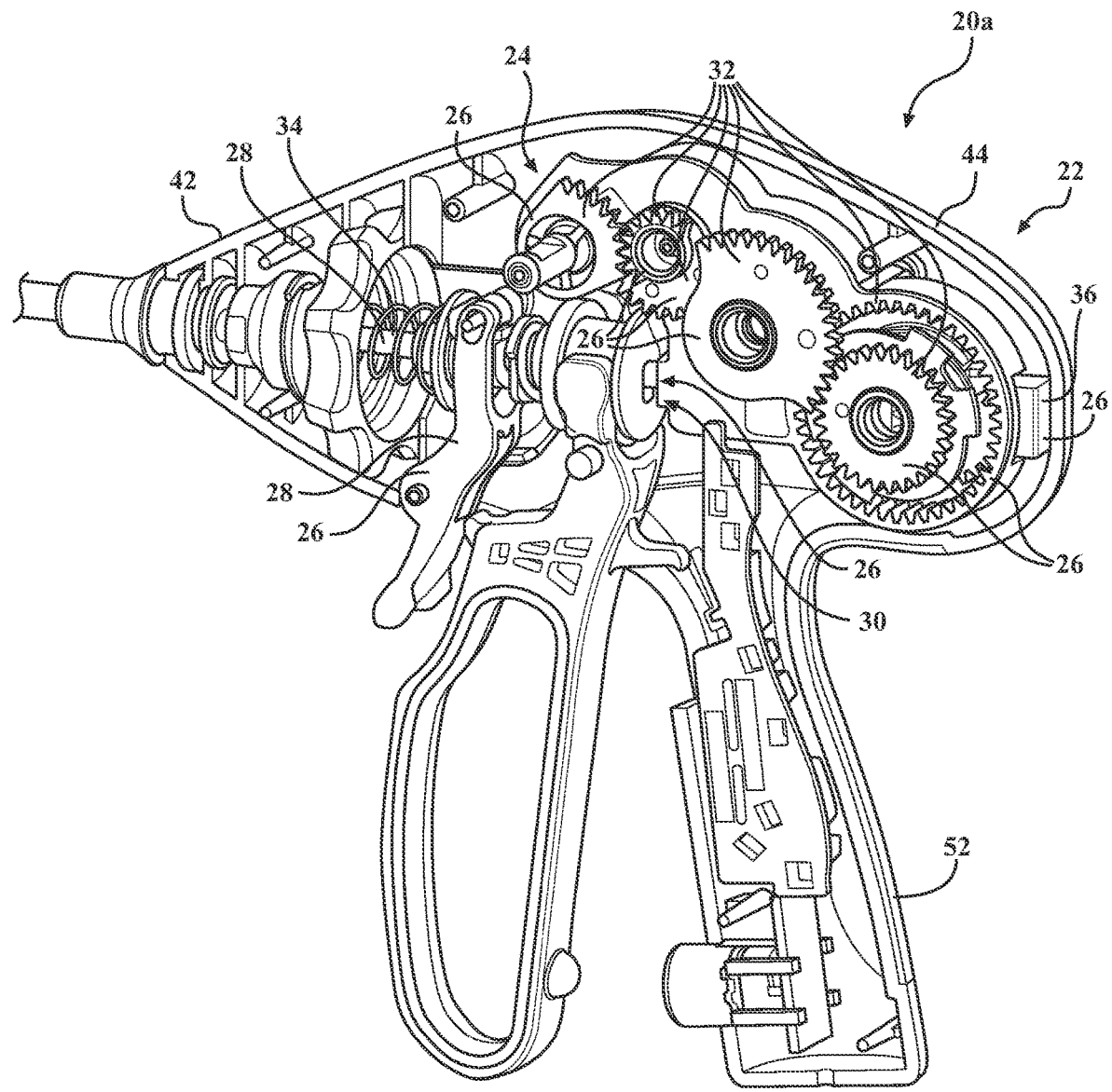
FIG. 2 is a perspective view of the surgical instrument of FIG. 1, with the first portion of the housing removed to show interior components.
Figure 4:
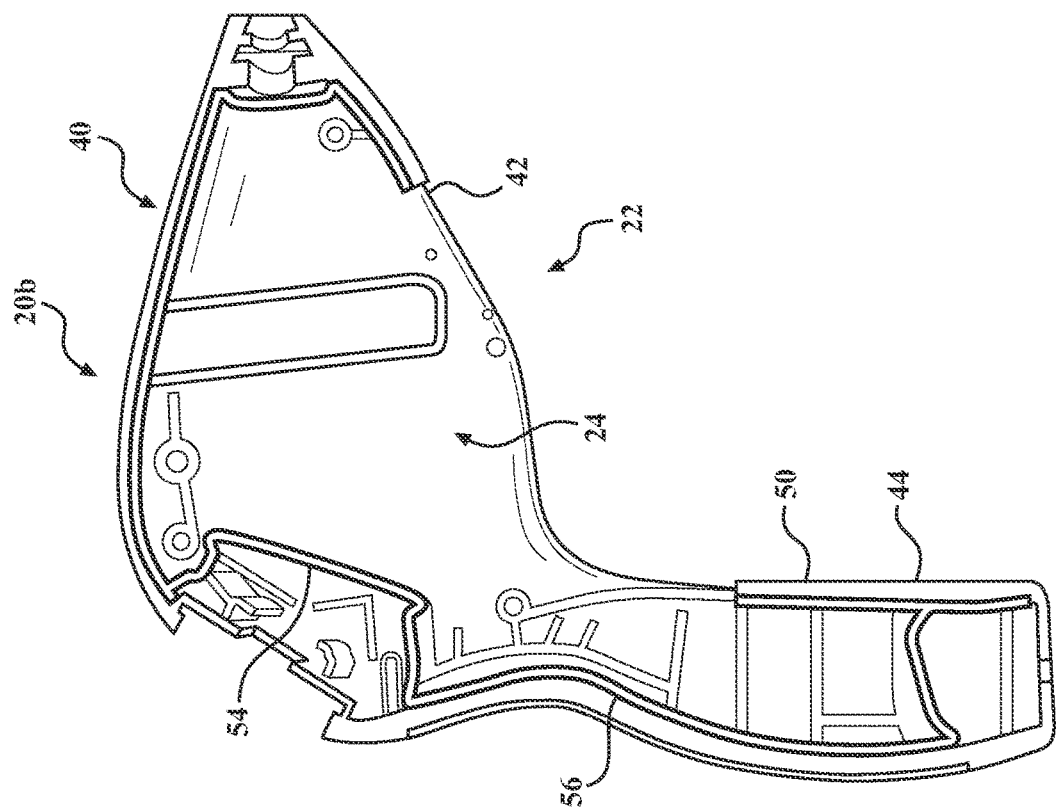
FIG. 4 is an elevational view of the mating member of FIG. 3, disposed on the first portion of the housing.
Figure 3:
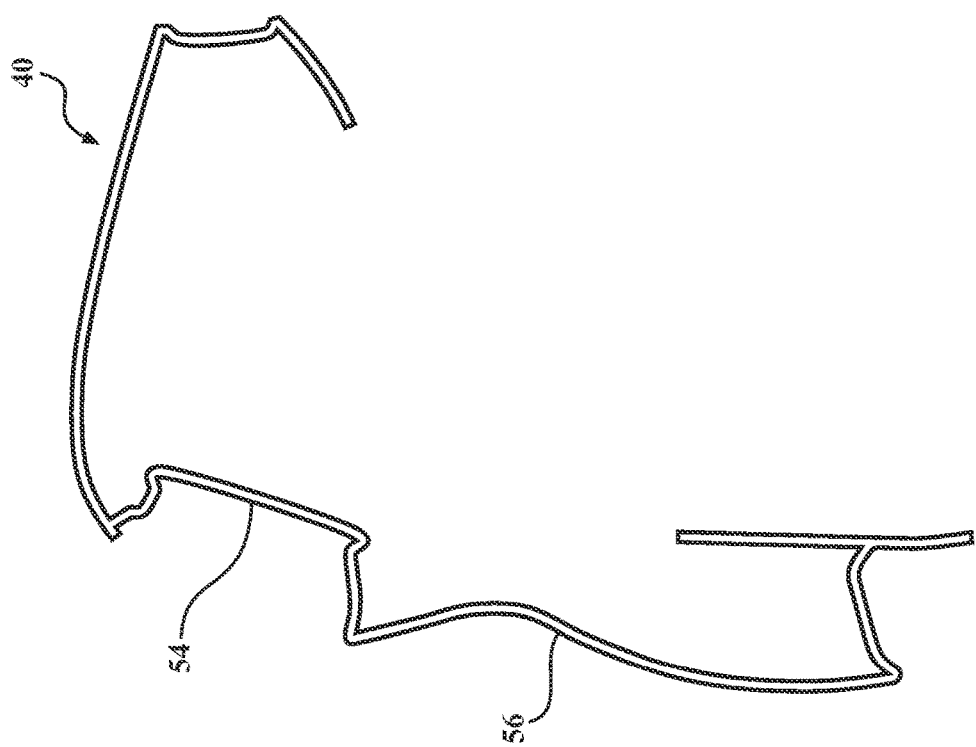
FIG. 3 is an elevational view of a mating member comprising a pre-formed wire and an adhesive.

As shown in FIG. 2, the surgical instrument 20a comprises a housing 22 defining a cavity 24 and at least one interior component 26 disposed within the cavity 24. Said differently, the housing 22 may be configured like a clamshell which opens to provide access to the interior component 26 in the cavity 24. The housing 22 may be comprised of a polymer, a metal, or any other suitable material. As shown in FIG. 2, the at least one interior component comprises a plurality of interior components 26. The interior components 26 cooperatively function to operate the surgical instrument 20a. The interior components 26 may comprise a trigger 28, a drive assembly 30, a gear 32, a shaft 34, and a slider 36. The interior components 26 may comprise numerous other components not explicitly described herein. Moreover, the type of interior components 26 will vary depending on the type of surgical instrument 20a and the function it performs.

The surgical instrument 20a may be collected after a surgical use and returned to a reprocessor where the instrument 20a is disassembled, cleaned/disinfected, serviced, re-assembled, sterilized and sold again. After reprocessing, the surgical instrument 20a is further defined as a reprocessed surgical instrument 20b, which may include at least one serviced interior component disposed within the cavity 24. In many cases, most of the original interior components 26 of the surgical instrument 20a may be re-used to provide the necessary parts for reassembly of the reprocessed surgical instrument 20b. Interior components 26 that wear during use, become irreversibly contaminated, break during disassembly, and/or are otherwise unable to be re-used as-is may be serviced. Servicing an interior components 26 includes (but is not limited to) cleaning, replacing, repairing, and/or modifying the interior component.

Although the present disclosure is shown and described with respect to the surgical instrument 20a shown in FIGS. 1 and 2, the systems and methods facilitating reprocessing provided in accordance with the present disclosure are equally applicable for use with any suitable surgical instrument 20a or portion(s) thereof. Obviously, different considerations apply to different instruments; however, the aspects and features of the present disclosure remain generally consistent regardless of the particular instrument 20a provided. For the purposes herein, the surgical instrument 20a is generally described.

A method of reprocessing the surgical instrument 20a is set forth herein. The method comprises the steps of opening the housing 22 along a seam 38 (see FIG. 1) to access the cavity 24 (see FIG. 2), servicing the at least one interior component, applying a mating member 40 to the housing 22 (see FIGS. 4, 6, 8A-C, 9A-C, 10A-B, and 11-18), joining together the housing 22 with the mating member 40, which may facilitate and/or be performed in conjunction with closing the housing 22 along the seam 38, and, optionally, reopening the housing 22 along the seam 38 to access the cavity 24. In some instances, the mating member 40 may be reusable after reopening the housing 22, so at to facilitate further servicing of at least one interior component and thereafter joining together the housing 22 with the mating member 40.

Figure 7C:
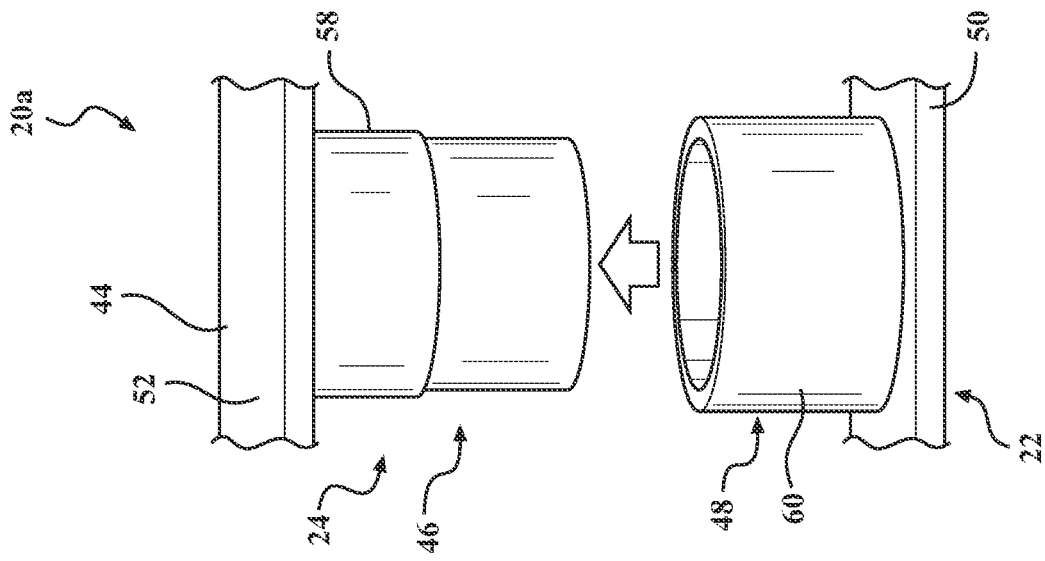
FIG. 7C is a perspective view of the pin removed from the pocket and deformed after the disassembly of the surgical instrument for reprocessing.
Figure 7B:
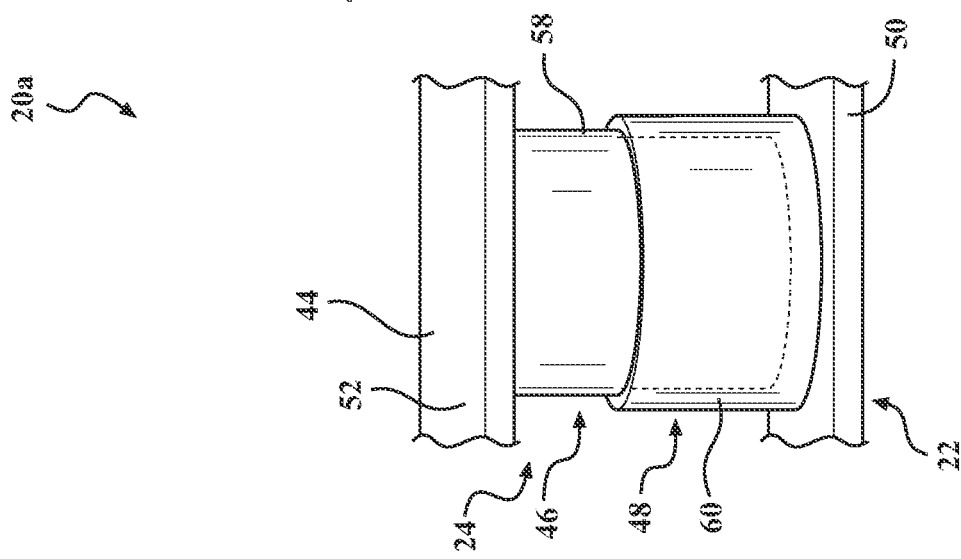
FIG. 7B is a perspective view of the pin inserted into the pocket after the original assembly of the surgical instrument.
Figure 7A:
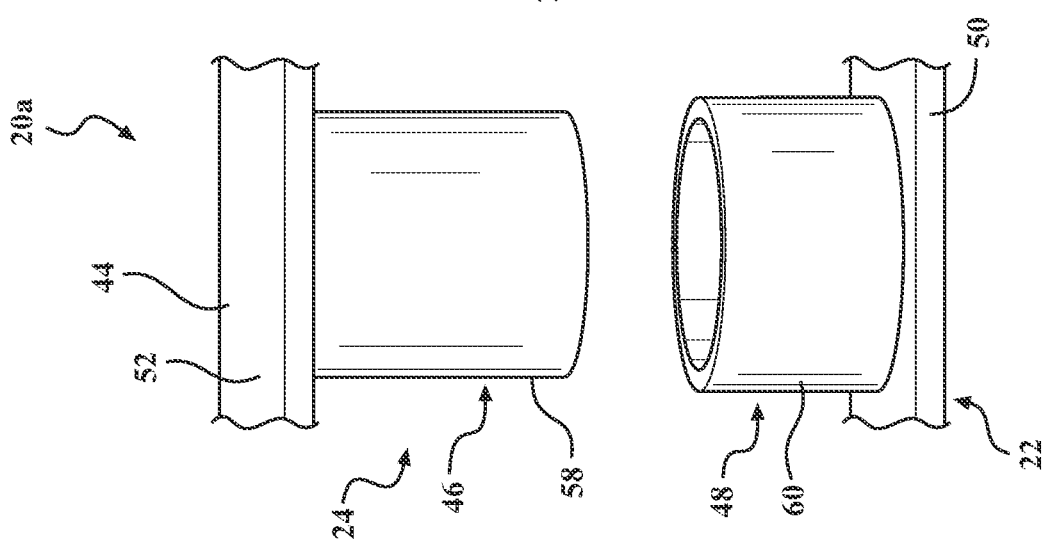
FIG. 7A is a perspective view of a pin and a pocket of the housing separated from one another prior to the original assembly of the surgical instrument.

Generally, during the original assembly of the surgical instrument 20a, the interior components 26 are placed within the cavity 24 of the housing 22 and the housing 22 is closed along the seam 38. The one or more housing components of the housing 22 may be joined together, such as joined together along the seam 38, to resist opening to prevent easy disassembly of the surgical instrument 20a, which is generally undesired by the original equipment manufacturer. The housing 22 may be joined to resist opening along the seam 38 by mechanical fasteners, friction interfaces, chemical bonding, welding, and the like. However, the use of the surgical instrument 20a causes wear and tear on the interior components 26, which in turn can cause the surgical instrument to operate unreliably or to become inoperable. Opening the housing 22 along the seam 38 to access and service the interior components 26 disposed within the cavity 24 may damage the fastening means originally used to keep the housing 22 closed along the seam 38. For example, a press-fit pin (a common friction interface) is designed to deform as it is pressed into its mating receptacle, thus increasing the friction therebetween (see FIGS. 7A-C). As such, when separated the deformed pin will not engage the receptacle with the original amount of friction therebetween when inserted. Alternatively, the pin may sheer during disassembly, rendering the pin incapable of securing the housing 22 when closed again. This limits the number of times that a surgical instrument 20a can be reprocessed.

Applying the mating member 40 to the housing 22 presents a new connection that joins together the housing 22 in a manner similar to the original manufacture of the surgical instrument 20a.

As described above, the method may further include the step of reopening the housing 22 along the seam 38 to access the cavity 24. As such, the interior components 26 may be accessed once again for further servicing. Moreover, the method may be repeated, allowing for repeated reprocessing of the surgical instrument 20a. Said differently, a new mating member 40 may be applied to the housing 22 after each opening of the housing 22 and servicing of the at least one interior component to facilitate closing the housing 22 along the seam 38 and joining together the housing 22 with the mating member 40. For example, the housing 22 may be joined at the new mating member 40. The ability to repeatedly reprocess the surgical instrument 20a increases the overall life of the surgical instrument 20a, reduces the amount of waste components, and lowers the overall cost of ownership of the surgical instrument 20a. Alternatively, in some cases, once the mating member has been added, the disassembly process may be greatly simplified as the newly applied mating member may result in efficient decoupling of the one or more housing components.

As shown in FIGS. 1, 2, 4, and 6, the seam 38 may be defined by a pair of opposing edges 42. The step of opening the housing 22 may be further defined as moving the pair of opposing edges 42 away from one another, and the step of closing the housing 22 and/or joining together the housing 22 may be further defined as moving the pair of opposing edges 42 toward one another. Likewise, the step of closing the housing 22 and/or joining together the housing 22 may be further defined as moving the pair of opposing edges 42 toward one another and into abutment with one another.

The housing 22 may be a unitary component that defines both of the pair of opposing edges 42. The unitary component is configured such that the edges may move toward and away from one another. The unitary component may facilitate movement of the edges by flexing, bending, pivoting about a hinge, etc. Alternatively, the housing 22 may comprise two or more sections or components that are separable from one another, as shown in FIGS. 1 and 2. The pair of edges may be disposed on opposing sections of the housing 22, with the edges configured to move toward and away from one another with movement of the sections/components toward and away from one another, respectively. The housing 22 may comprise any suitable number of sections.

The step of applying the mating member 40 to the housing 22 may be further defined as the step of applying the mating member 40 to one or more of the housing 22 components. In certain instances, the mating member 40 may be applied to the one or more housing components adjacent the seam 38. Furthermore, the step of applying the mating member 40 may be further defined as applying the mating member 40 to the housing 22 adjacent at least one of the pair of opposing edges 42. As shown in FIGS. 4, 6, 8-10, and 16-18, the mating member 40 may be disposed within the cavity 24 of the housing 22 and adjacent to the edge. As one example, the mating member 40 may be disposed along an interior or exterior 44 (see FIG. 12) of the housing 22 and adjacent the edge.

The step of applying the mating member 40 may further comprise securing a protrusion 46 on the housing 22 adjacent one of the pair of opposing edges 42 and a receptacle 48 for receiving the protrusion 46 on the housing 22 adjacent the other one of the pair of opposing edges 42, as shown in FIGS. 7-15, 17, and 18. Moreover, the step of joining together the housing 22 with the mating member 40 may be further defined as inserting the protrusion 46 into the receptacle 48 to join together the housing 22. For example and without limitation, a protrusion 46 and receptacle 48 used to join together the housing 22 may be provided respectively in the form of a pin and pocket for receiving the pin, a stud and one or more bores for receiving the stud, and one or more teeth and one or more valleys for receiving the one or more teeth. These and other examples are explained in more detail below. In some configurations, the mating member 40 may include multiple protrusions 46. In such embodiments, the mating member 40 also includes multiple receptacles 48 and the step of joining together the housing 22 with the mating member 40 may be further defined as inserting the protrusions 46 into the receptables 48 to join together the housing 22.

The protrusion 46 and the receptacle 48 may form an interference fit. More specifically, the protrusion 46 and the receptacle 48 may have opposing walls arranged transverse to the potential direction of movement of the protrusion 46 and the receptacle 48, thus preventing movement.

FIGS. 11A-B show an example of an interference fit wherein two mating members 40 are applied to the housing 22: one adjacent one of the edges and the other adjacent the other one of the edges. The mating members 40 each have a plurality of protrusions 46 configured as teeth and a plurality of receptacles 48 configured as valleys between the teeth, with the teeth configured to be disposed within the opposite valleys in an interference fit when the seam 38 is closed (see FIG. 11B).

Figure 12:
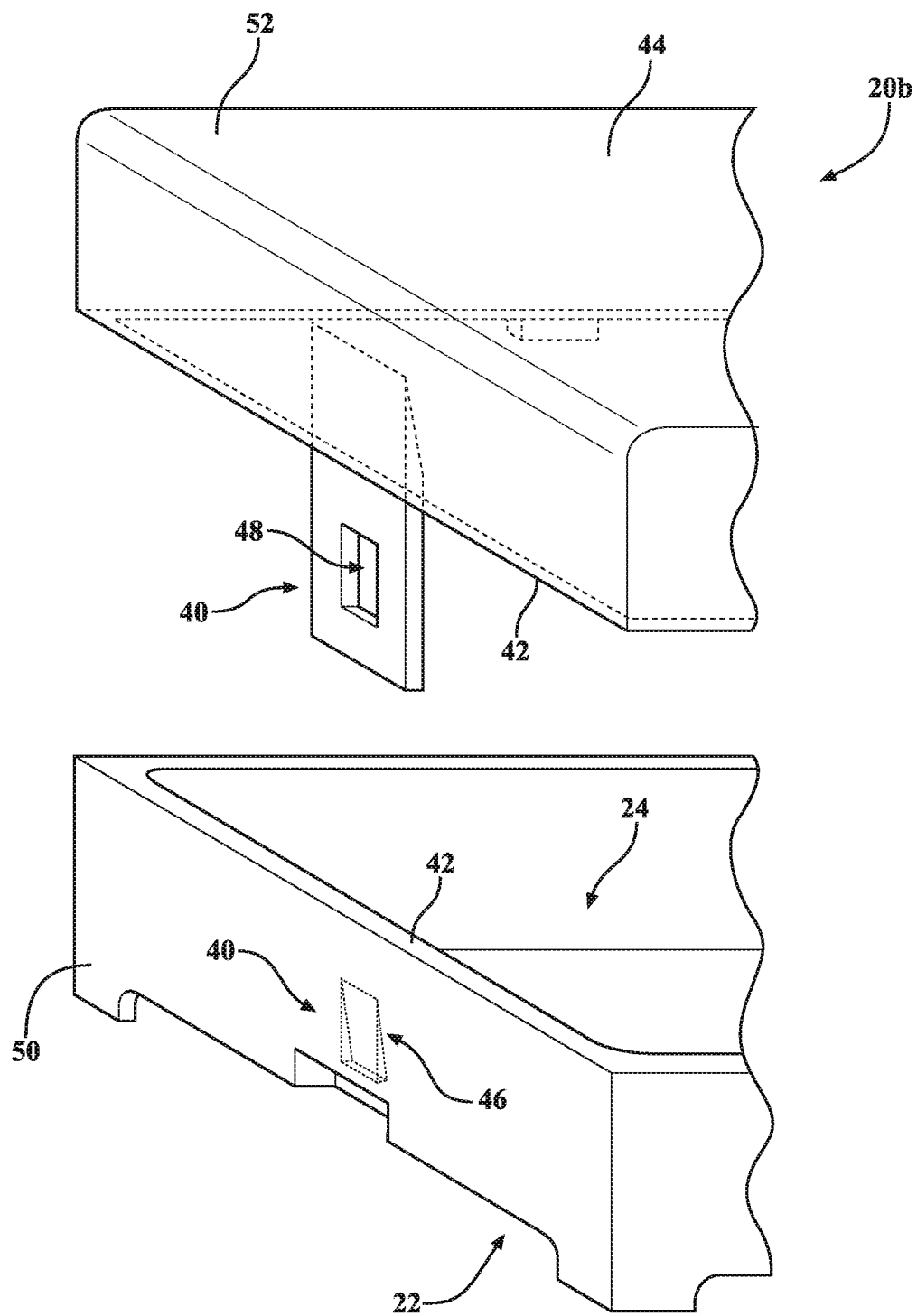
FIG. 12 is a perspective view of two mating members separated from one another prior to the assembly of the reprocessed surgical instrument, with one of the mating members configured as a tab and the other one of the mating members configured as a ramp.

FIG. 12 shows an example of an interference fit wherein the mating member 40 is configured as a tab defining the receptacle 48 and is disposed adjacent one of the edges. The protrusion 46 was previously disposed adjacent the other edge and is arranged as a ramp. The tab slides up the ramp until the ramp snaps into the receptacle 48 when the seam 38 (see FIG. 1) is closed.

Figure 14:
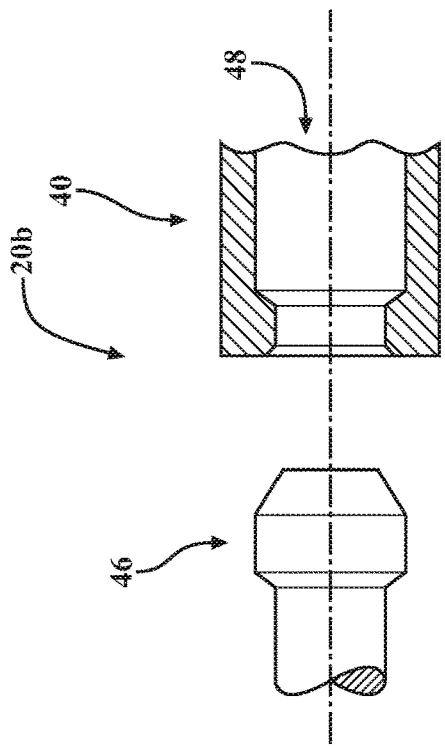
FIG. 14 is an elevational view of a mating member configured as a receptacle and separated from a protrusion having a tapered surface prior to the assembly of the reprocessed surgical instrument.
Figure 15:
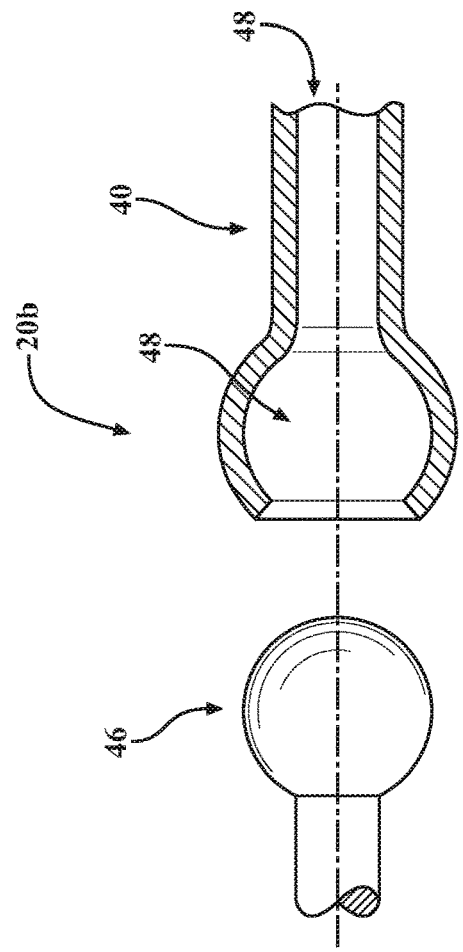
FIG. 15 is an elevational view of a mating member configured as a receptacle and separated from a protrusion having a round surface prior to the assembly of the reprocessed surgical instrument.
Figure 13:
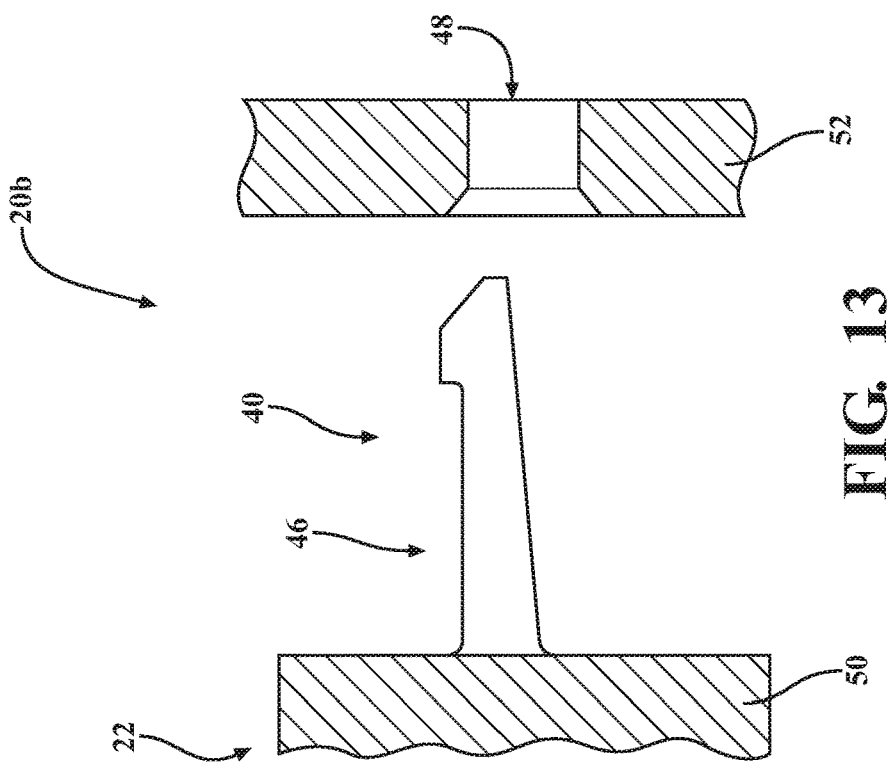
FIG. 13 is an elevational view of a mating member configured as a protrusion and separated from a receptacle prior to the assembly of the reprocessed surgical instrument.

FIG. 13 shows an example of an interference fit wherein the mating member 40 is applied to the housing 22 adjacent one of the edges and comprises the protrusion 46 having a head defining a shoulder. The receptacle 48 was previously disposed adjacent the other edge and defines a locking wall opposing the shoulder. The protrusion 46 slides into the receptacle 48 and the shoulder engages the locking wall of the receptacle 48 when the seam 38 is closed. FIGS. 14 and 15 show examples of an alternative arrangement. More specifically, the mating member 40 is applied to the housing 22 adjacent one of the edges and comprises the receptacle 48 defining the locking wall. The protrusion 46 was previously disposed adjacent the other edge and has the head defining the shoulder, which opposes the locking wall. The protrusion 46 slides into the receptacle 48 and the shoulder engages the locking wall of the receptacle 48 when the seam 38 is closed.

The protrusion 46 and the receptacle 48 may form a friction fit. More specifically, the protrusion 46 and the receptacle 48 may have opposing walls arranged parallel to the potential direction of movement of the protrusion 46 and the receptacle 48, with the friction between the two walls preventing movement. FIGS. 8-10 and 17 show examples of a friction fit between the protrusion 46 and the receptacle 48. In each of the examples, the protrusion 46 and the receptacle 48 each have a cylindrical configuration and are sized such that the protrusion 46 abuts the receptacle 48 about the perimeter when the seam 38 (see FIG. 1) is closed.

As shown in FIGS. 1 and 2, the housing 22 may comprise at least first and second portions 50, 52 movable independent of one another. The step of opening the housing 22 may be further defined as moving the first and second portions 50, 52 away from one another. Likewise, the step of closing and/or joining together the housing 22 may be further defined as moving the first and second portions 50, 52 toward one another. The first and second portions 50, 52 may be unitary or may be separated into sections, as described above. The step of applying the mating member 40 may be further defined as applying the mating member 40 to at least one of the first and second portions 50, 52. The step of applying the mating member 40 may further comprise securing the protrusion 46 on one of the first and second portions 50, 52 and a receptacle 48 for receiving the protrusion 46 on the other one of the first and second portions 50, 52. The step of joining together the housing 22 with the mating member 40 may be further defined as inserting the protrusion 46 into the receptacle 48 to join the first portion 50 to the second portion 52. As described above, the protrusion 46 and the receptacle 48 may form an interference fit. Alternatively, the protrusion 46 and the receptacle 48 may form a friction fit. Examples of the interference and friction fits are described above.

In some cases, the housing is welded together at the seam 38. Said differently, the housing 22 may be welded together during the original assembly of the surgical instrument 20a, and/or during reassembly the housing 22 when reprocessing the surgical instrument 20a. For instance, the step of closing the housing 22 along the seam 38 and/or joining together the housing 22 with the mating member 40 may include welding the seam 38, which may be used in combination with one or more of the other mating members 40 described herein to close and/or join together the housing 22. The housing 22 may be welded together by ultrasonic welding. However, any suitable welding process may be utilized.

In one example, the step of servicing the at least one interior component is further defined as cleaning the at least one interior component. In another example, the step of servicing the at least one interior component is further defined as replacing the at least one interior component. In another example, the step of servicing the at least one interior component is further defined as repairing the at least one interior component. Furthermore, the step of servicing the at least one interior component may by further defined as modifying the at least one interior component. However, any other suitable manner of servicing may be utilized.

The step of servicing the at least one interior component may comprise a plurality of servicing steps. For example, the at least one interior component may be both cleaned and repaired. Moreover, more than one interior component may be serviced. Those interior components 26 may undergo the same manner of servicing or different manners of servicing. Moreover, the number of and manner(s) of servicing may differ between the plurality of interior components 26.

As described above, the interior component may comprise at least one of the trigger 28, the drive assembly 30, the gear 32, the shaft 34, and the slider 36. Each of these components may be configured for servicing. However, this list is not exclusive. Any other interior component (not described in the list above) may be configured to be serviced. Moreover, as mentioned above, the type of interior components 26 will vary depending on the type of surgical instrument 20a and the function it performs. As such, the serviceable interior components 26 will vary depending on the type of surgical instrument 20a and the function it performs. Generally speaking, the interior component can be understood as a component that is disposed within the housing and inaccessible before the housing components are separated from one another.

In one example shown in FIGS. 3-6, the mating member 40 comprises a pre-formed wire 54 and an adhesive 56 disposed on the pre-formed wire 54. The pre-formed wire 54 is typically comprised or consists of a metal, but may also comprise or consist of a polymer or other suitable material. In this example, the step of applying the mating member 40 to the housing 22 is further defined as the step of disposing the pre-formed wire 54 along one of the pair of opposing edges 42. Furthermore, the step of joining together the housing 22 with the mating member 40 is further defined as the step of bonding the adhesive 56 to the housing 22 along both of the pair of opposing edges 42 to join together the housing 22. Said differently, when the housing 22 is pressed, the adhesive 56 bonds together the housing 22 along the seam 38. This method in-turn creates the reprocessed surgical instrument 20b. The reprocessed surgical instrument 20b comprises the mating member 40 applied to at least one of the first and second portions 50, 52. The mating member 40 may comprise the pre-formed wire 54 disposed along the entire edge of the first and/or second portions 50, 52 and the adhesive 56 disposed on the pre-formed wire 54 and bonded to both of the first and second portions 50, 52 to join together the first and second portions 50, 52.

As shown in FIGS. 1, 2, 4, and 6, the seam 38 may be defined by a pair of opposing edges 42. In the above example, in which the mating member 40 comprises a pre-formed wire 54 and an adhesive 56, the step of opening the housing 22 may be defined as moving the pair of opposing edges 42 away from one another. Further, the step of closing the housing 22 and/or joining together the housing 22 may be further defined as moving the pair of opposing edges 42 toward one another. Likewise, the step of closing the housing 22 and/or joining together the housing 22 may be further defined as moving the pair of opposing edges 42 toward one another and into abutment with one another. Once the opposing edges 42 are moved towards and into abutment with one another, the opposing edges 42 are bonded together by the adhesive 56 and the first and second portions 50, 52 are joined together to form the housing 22.

Figure 6:
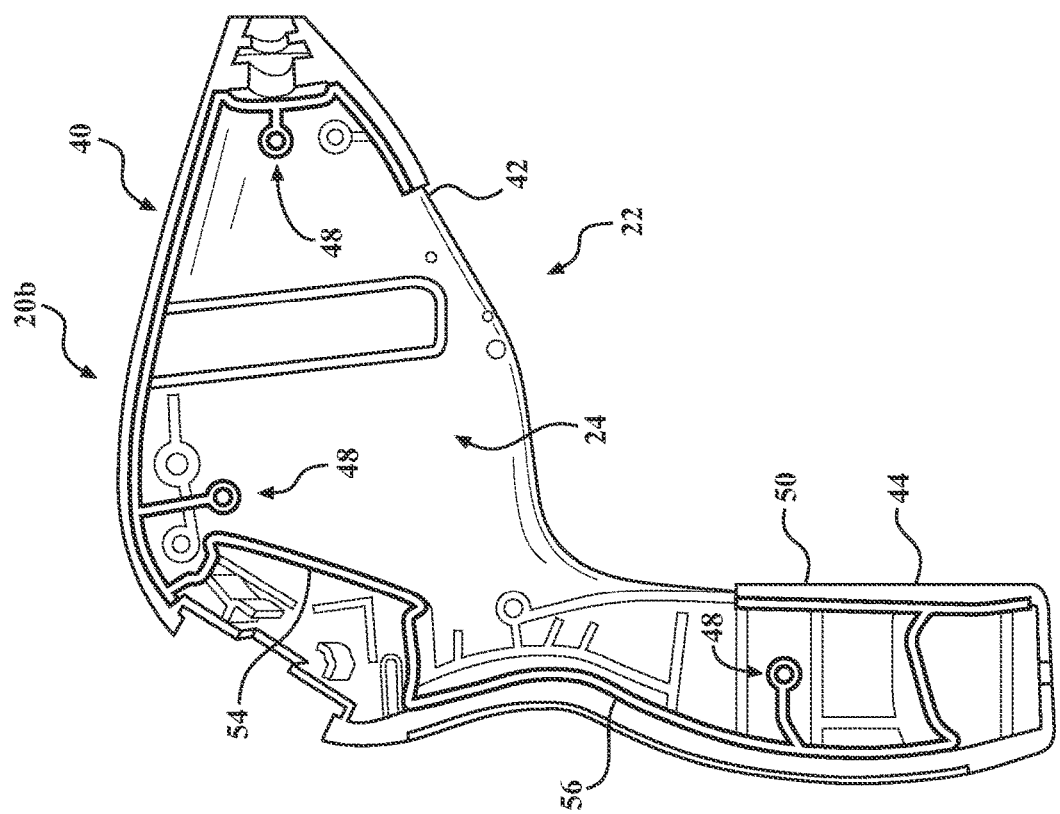
FIG. 6 is an elevational view of the mating member of FIG. 5, disposed on the first portion of the housing.
Figure 5:
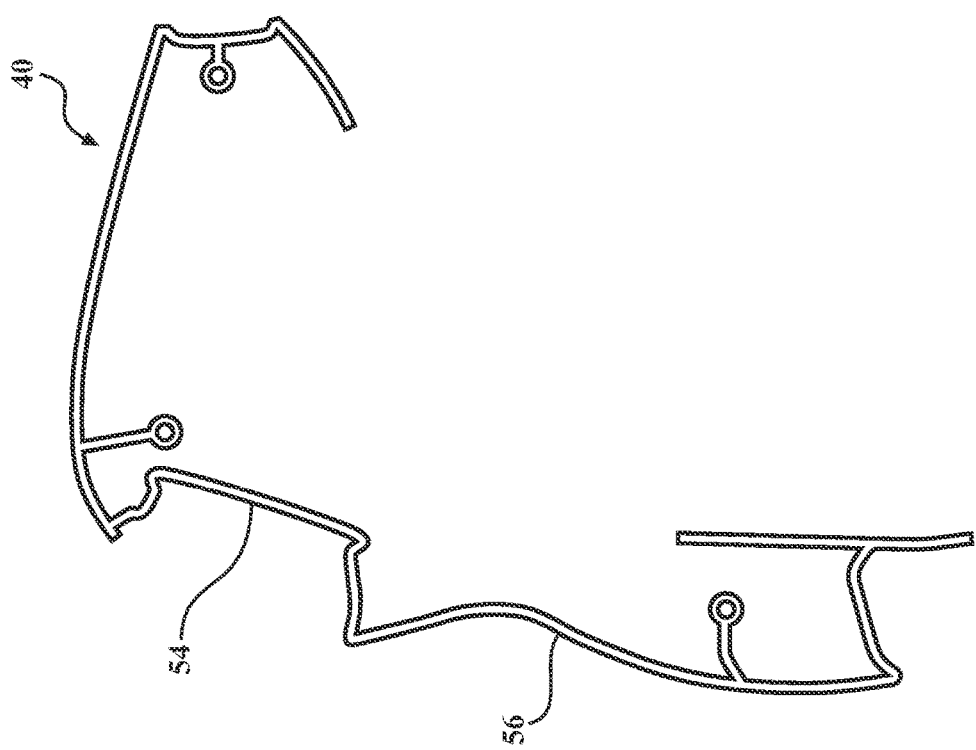
FIG. 5 is an elevational view of a mating member comprising a pre-formed wire, an adhesive, and receptacles.

As shown in FIGS. 5 and 6, the mating member 40 may further comprise at least one of the aforementioned receptacles 48 and/or protrusions 46 mounted to the preformed wire 54. The receptacles 48/protrusions 46 may be configured to replace previously used receptacles 48/protrusions 46 disposed along the edge. Each protrusion 46/receptacle 48 is configured to engage the corresponding and opposing receptacle 48/protrusion 46, respectively, on the opposite edge for creating a press-fit connection therebetween. The protrusions 46/receptacles 48 may be comprised of a polymer, a metal, or any suitable material. Furthermore, the adhesive 56 may be disposed along the protrusions 46/receptacles 48 for bonding the protrusions 46/receptacles 48 to the housing 22.

As stated above, the receptacles 48 and/or protrusions 46 mounted to the preformed wire may be configured to replace the previously used receptacles 48 and/or protrusions 46 originally located on the first and second portions 50, 52, respectively. In replacing the previously used receptacles 48 and/or protrusions 46, these elements 46, 48 may also be removed from the first and second portions 50, 52 prior to applying the mating member 40 to the housing 22. The receptables 48 and/or protrusions 46 may be removed by milling the surface of the first and second portions 50, 52 or via any other suitable means of removal. Removing the original receptacles 48 and protrusions 46 from the housing 22 avoids interference between the original receptacles 48 and protrusions 46 and the mating member 40. Once removed, the receptacles 48 and protrusions 46 included as a part of the mating member 40 may replace the original receptables 48 and protrusions 46 located on the first and second portions 50, 52, respectively.

In one example shown in FIGS. 7-9, the housing 22 further comprises a pin 58 disposed on one of the first and second portions 50, 52 and a pocket 60 disposed on the other one of the first and second portions 50, 52 and arranged to receive the pin 58. In this example, the mating member 40 comprises a sleeve 62 (see FIGS. 8 and 9) having an annular configuration defining an inner surface 64 sized to press-fit onto the pin 58 and an outer surface 66 sized to press-fit into the pocket 60. The step of applying the mating member 40 to the housing 22 is further defined as the step of securing the sleeve 62 to one of the pin 58 and the pocket 60 and the step of joining together the housing 22 with the mating member 40 further comprises securing the sleeve 62 with the other one of the pin 58 and the pocket 60 to join together first and second portions 50, 52. The sleeve 62 is configured to achieve a press-fit engagement with both of the pin 58 and the pocket 60, thus coupling the pin 58 with the pocket 60.

This method in-turn creates the reprocessed surgical instrument 20b. The reprocessed surgical instrument 20b comprises the pin 58 disposed on one of the first and second portions 50, 52 and the pocket 60 disposed on the other one of the first and second portions 50, 52 and arranged to receive the pin 58. The reprocessed surgical instrument 20b further comprises the mating member 40 applied to at least one of the first and second portions 50, 52. The mating member 40 comprises the sleeve 62 defining the inner surface 64 sized to press-fit onto the pin 58 and the outer surface 66 sized to press-fit into the pocket 60 to join together the first and second portions 50, 52. The sleeve 62 may have the annular configuration, as described above.

It is to be appreciated that the sleeve 62 may be placed on the pin 58 first (as shown in FIGS. 8A-C) or placed in the pocket 60 first (as shown in FIGS. 9A-C). The sleeve 62 acts as an intermediate component between the pin 58 and the pocket 60, therefore the order of assembly with the pin 58 and the pocket 60 may vary.

Figure 10A:
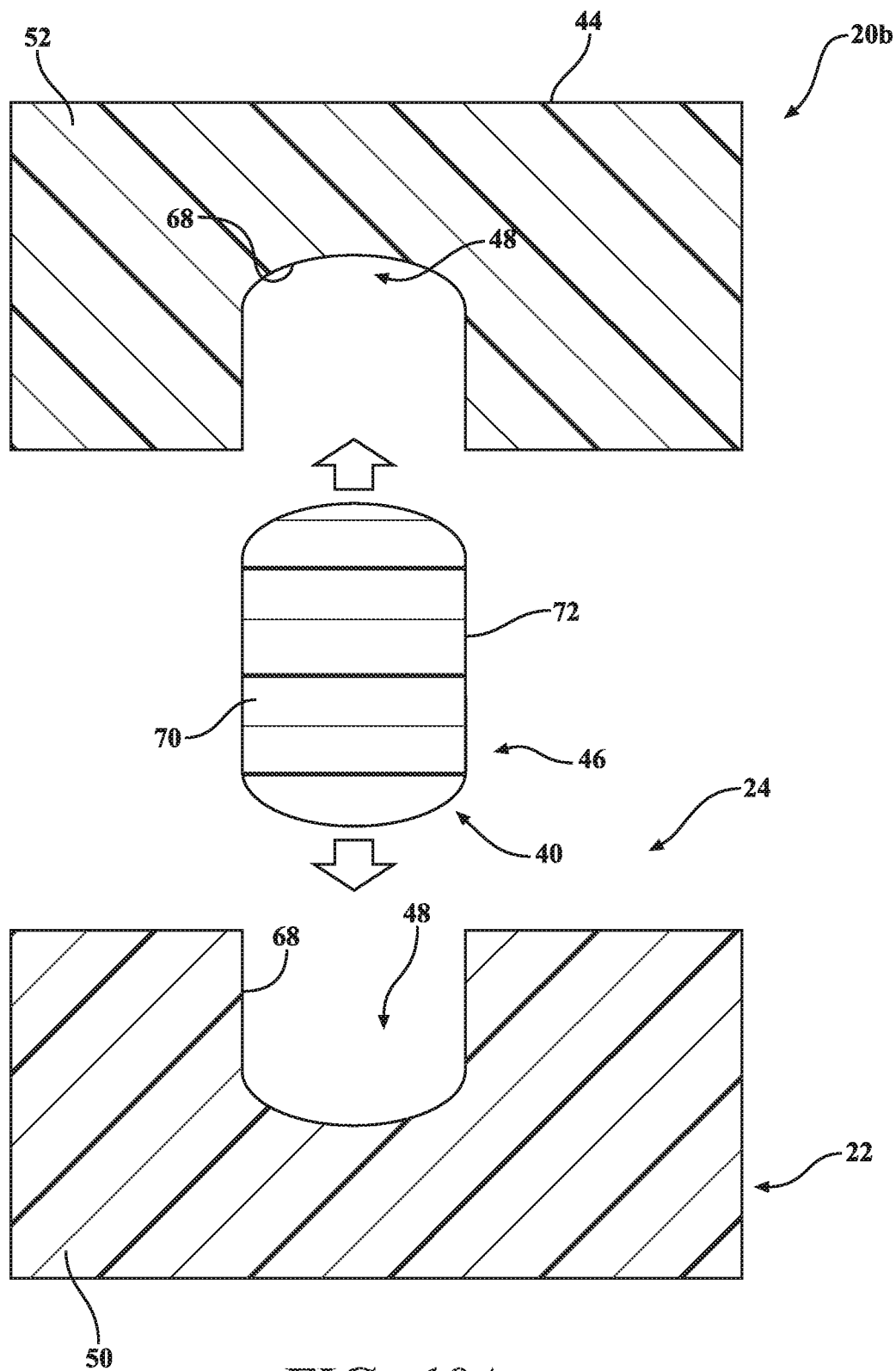
FIG. 10A is a cross-sectional view of a pair of bores of the housing separated from one another prior to assembly after reprocessing, with a mating member disposed therebetween, the mating member configured as a stud to be inserted into both bores.
Figure 10B:
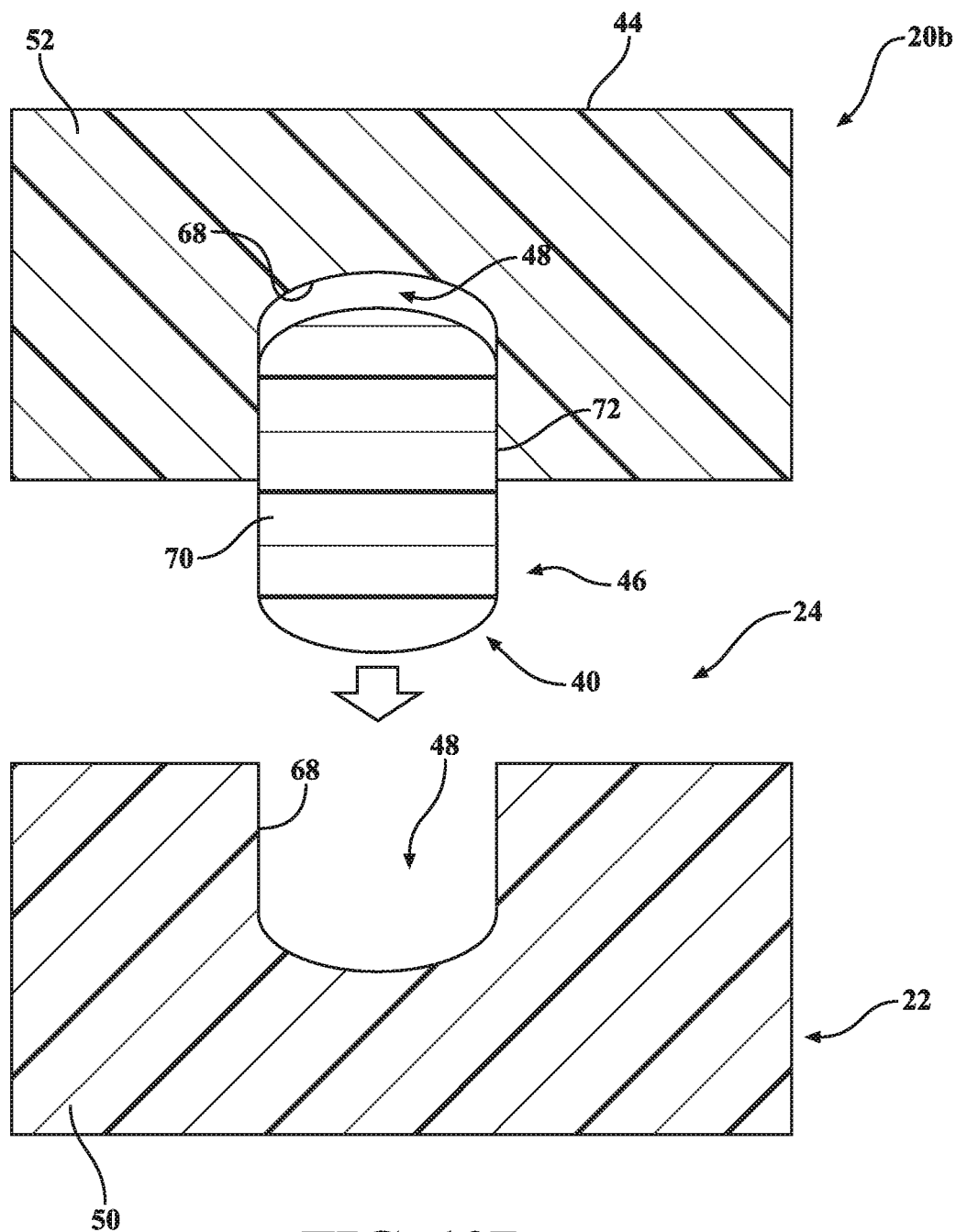
FIG. 10B is a cross-sectional view of the stud inserted into one of the bores during assembly of the reprocessed surgical instrument.

In one example shown in FIGS. 10A-B, each of the first and second portions 50, 52 define a bore 68 longitudinally aligned with one another. The bores 68 may be formed in the housing 22 during the reprocessing of the surgical instrument 20a, such as using a drill or milling machine. The mating member 40 comprises a stud 70 having an outer surface 72 sized to press-fit into both of the bores 68 of the first and second portions 50, 52. The step of applying the mating member 40 to the housing 22 is further defined as the step of press fitting the stud 70 into the bore 68 of one of the first and second portions 50, 52 (as shown in FIG. 10B). The step of joining together the housing 22 with the mating member 40 is further defined as the step of press fitting the stud 70 into the bore 68 of the other one of the first and second portions 50, 52 to join together the first and second portions 50, 52. It is to be appreciated that the stud 70 may be placed in either bore 68 first. The stud 70 acts as an intermediate component between the bores 68, therefore the order of assembly with the bores 68 may vary. The stud 70 is configured to achieve a press-fit engagement with both of the bores 68, thus coupling the first and second portions 50, 52 to each other. This method in-turn creates the reprocessed surgical instrument 20b. The reprocessed surgical instrument 20b comprises the housing 22, with each of the first and second portions 50, 52 defining the bore 68 longitudinally aligned with one another. The reprocessed surgical instrument 20b further comprises the mating member 40 applied to at least one of the first and second portions 50, 52. The mating member 40 comprises the stud 70 having the outer surface 72 sized to press-fit into both of the bores 68 of the first and second portions 50, 52 to join together the first and second portions 50, 52. The stud 70 may have a cylindrical configuration, as described above.

Figure 16B:
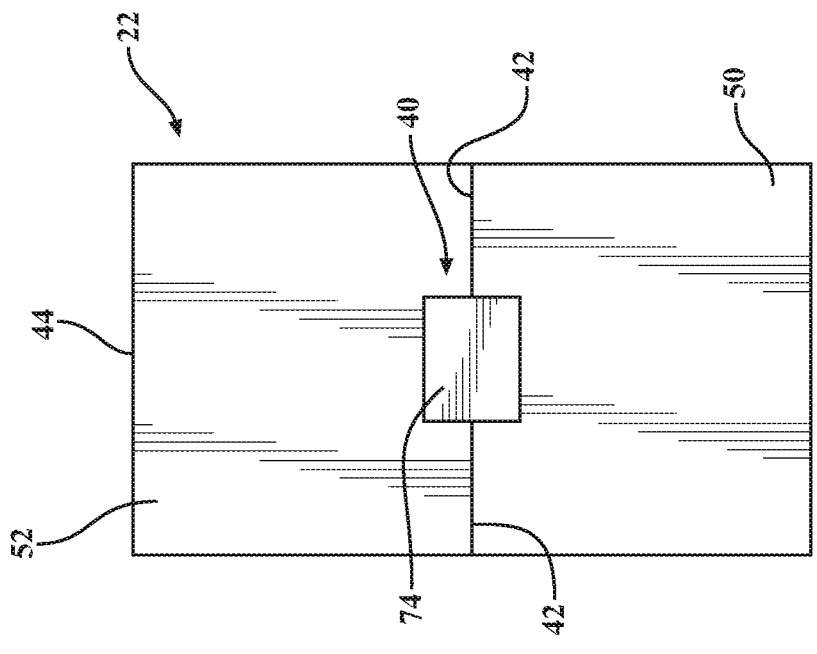
FIG. 16B is an elevational view of the first and second portions of the housing abutting one another after assembly of the reprocessed surgical instrument, with the sacrificial insert dispersed into first and second portions after welding.
Figure 16A:
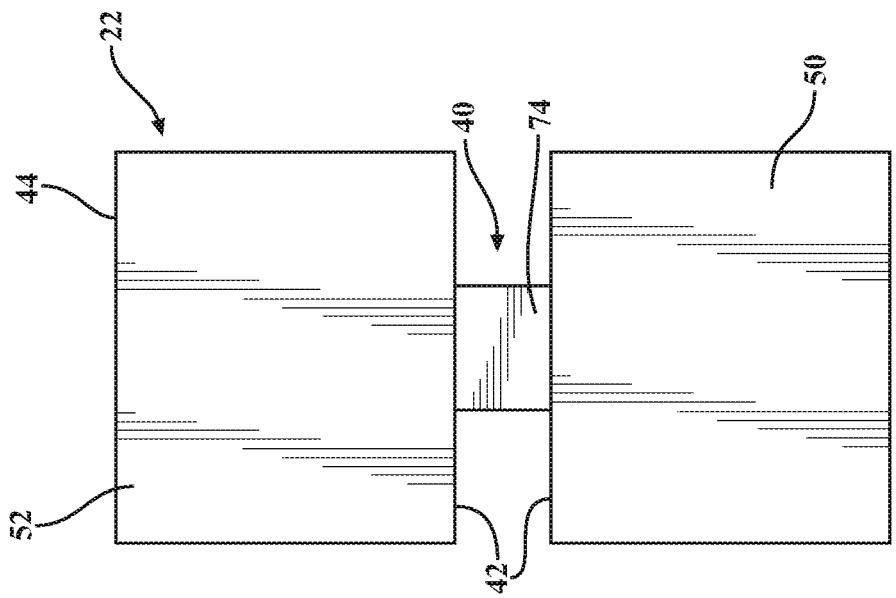
FIG. 16A is an elevational view of the first and second portions of the housing separated from one another prior to the assembly of the reprocessed surgical instrument, with a mating member configured as a sacrificial insert disposed therebetween.

In one example shown in FIGS. 16A-B, the mating member 40 is further defined as a sacrificial insert 74 that is disposed between the first and second portions 50, 52 of the housing 22 at the edge. The housing 22 undergoes a welding process that draws the edges toward one another to form the seam 38. The sacrificial insert 74 disperses into the softened material of the housing 22 during the welding process and binds to each of the first and second portions 50, 52, thus joining together the first and second portions 50, 52 (as shown in FIG. 16B).

Figure 17:
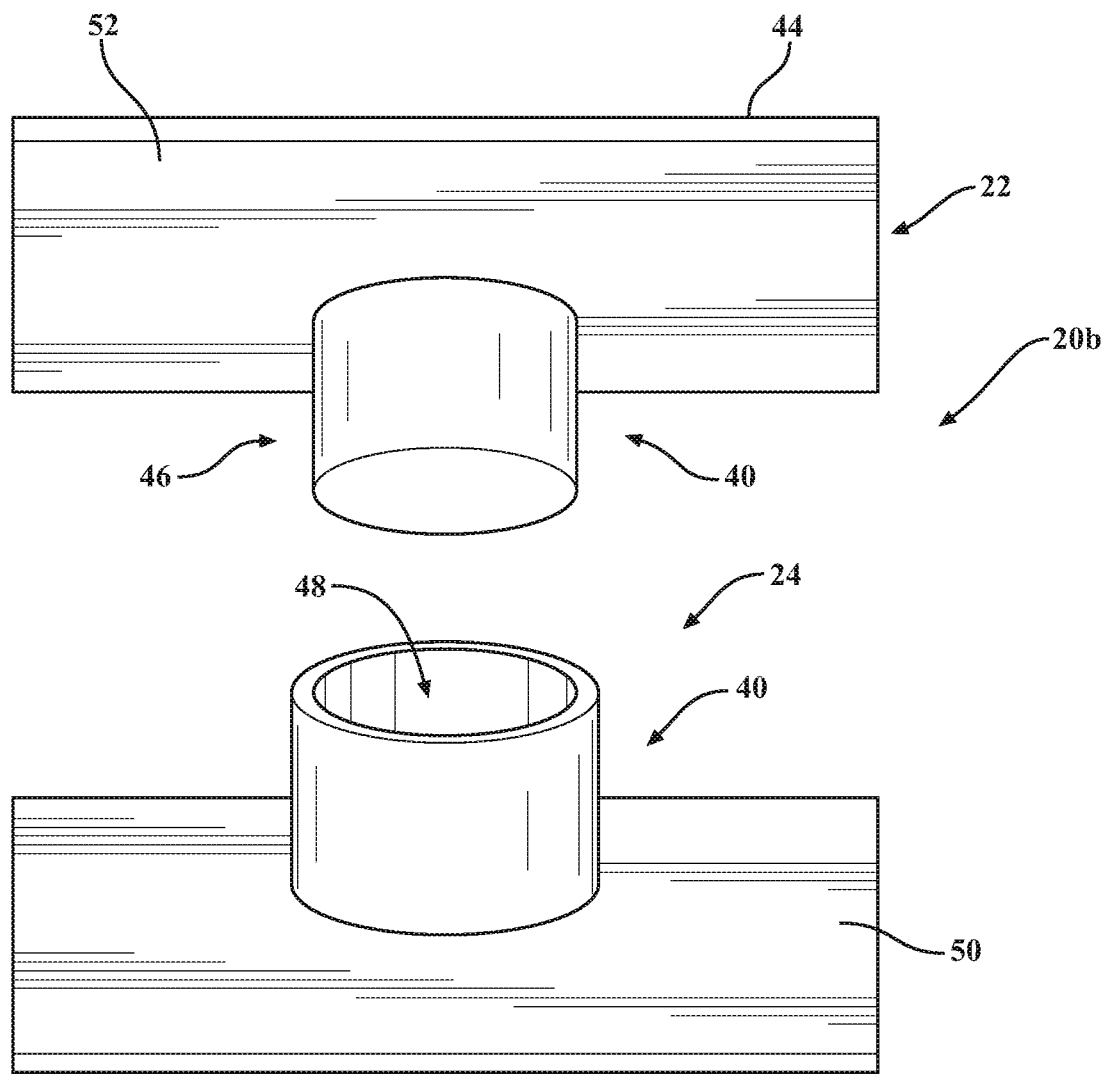
FIG. 17 is perspective view of two mating members separated from one another prior to the assembly of the reprocessed surgical instrument, with one of the mating members configured as a protrusion and the other mating member configured as a receptacle.

In one example shown in FIG. 17, the mating member 40 is further defined as both the protrusion 46 and the receptacle 48. The protrusion 46 is applied to one of the first and second portions 50, 52 of the housing 22 and the receptacle 48 is applied to the other one of the first and second portions 50, 52 of the housing 22. In one example, the protrusion 46 and the receptacle 48 are applied to the housing 22 by welding. However, the protrusion 46 and the receptacle 48 may be applied by adhesive or any other suitable manner. When the housing 22 is closed along the seam 38, the protrusion 46 is disposed in the receptacle 48 in a friction-fit (as described above) which joins together the first and second portions 50, 52.

Figure 18:
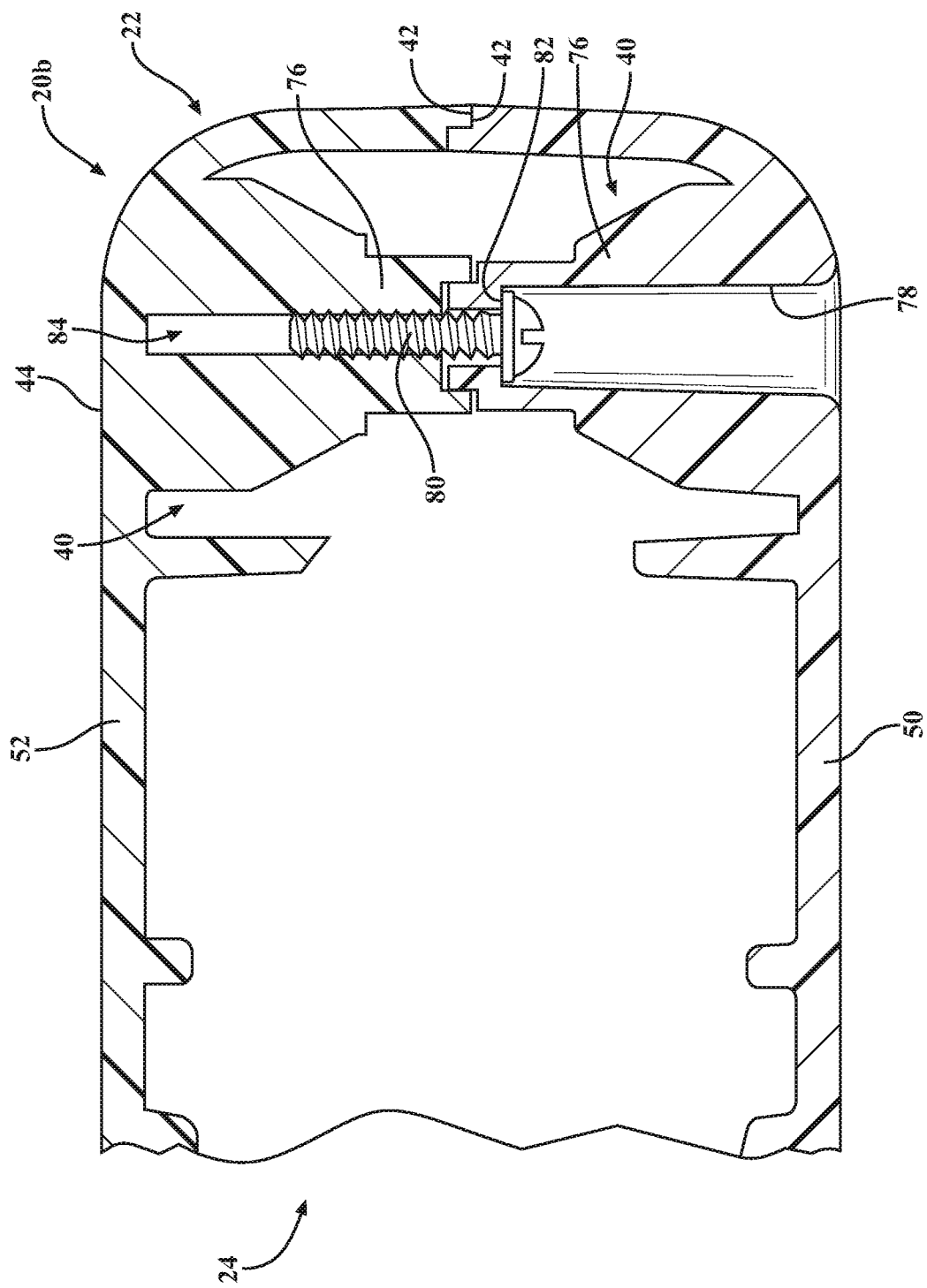
FIG. 18 is a cross-sectional view of two mating members mounted on the first and second portions of the housing and configured as bosses, with a threaded fastener joining together the bosses after assembly of the reprocessed surgical instrument.

In one example shown in FIG. 18, the mating member 40 is further defined as a pair of bosses 76. One of the bosses 76 is applied to the first portion 50 of the housing 22 and the other one of the bosses 76 is applied to the second portion 52 of the housing 22. The bosses 76 are axially aligned when the housing 22 is closed along the seam 38. One of the bosses 76 defines an access hole 78 for inserting a threaded fastener 80 (such as a screw) therein and a lip 82 for engaging a head of the threaded fastener 80. The other one of the bosses 76 defines an engagement hole 84 sized to engage the threads of the threaded fastener 80. The engagement of the head of the threaded fastener 80 with the lip 82 of the one of the bosses 76 and the threads with the other one of the bosses 76 in the engagement hole 84 draws together the bosses 76 and joins the first and second portions 50, 52 of the housing 22.

Methods are described herein for creating a reprocessed, i.e. serviced, surgical instrument 20b. The reprocessed surgical instrument 20b includes the housing 22 defining the cavity 24 and the at least one serviced interior component 26 disposed within the cavity 24. The housing 22 may include first and second portions 50, 52 movable independent of one another. The first and second portions 50, 52 each have a pair of opposing edges 42 defining a seam 38. In certain embodiments of the reprocessed surgical instrument 20b, the mating member 40 may include at least one of the pre-formed wire 54 and adhesive 56, the sleeve 62, and the stud 70. Regardless of the form of mating member 40 used in the reprocessed surgical instrument 20b, the mating member 40 joins together the first and second portions 50, 52 to form the housing 22.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A method of reprocessing a surgical instrument comprising a housing defining a cavity and at least one interior component disposed within the cavity, the method comprising the steps of:
   opening the housing along a seam to access the cavity;
   servicing the at least one interior component;
   applying a pre-formed mating member to the housing;
   joining together the housing with the pre-formed mating member; and
   reopening the housing along the seam to access the cavity.

2. The method as set forth in claim 1, wherein the seam is defined by a pair of opposing edges, wherein the step of opening the housing comprises moving the pair of opposing edges away from one another, and wherein the step of joining together the housing comprises moving the pair of opposing edges toward one another.

3. The method as set forth in claim 2, wherein the step of applying the pre-formed mating member comprises applying the pre-formed mating member to the housing adjacent at least one of the pair of opposing edges.

4. The method as set forth in claim 2, wherein the pre-formed mating member comprises a pre-formed wire and an adhesive disposed on the pre-formed wire, wherein the step of applying the pre-formed mating member to the housing comprises disposing the pre-formed wire along one of the pair of opposing edges, and wherein the step of joining together the housing with the pre-formed mating member comprises bonding the adhesive to the housing along both of the pair of opposing edges to join together the housing.

5. The method as set forth in claim 1, wherein the housing comprises first and second portions joined at the seam, wherein the step of opening the housing comprises moving the first and second portions away from one another, and wherein the step of joining the housing comprises moving the first and second portions toward one another.

6. The method as set forth in claim 5, wherein the step of applying the pre-formed mating member comprises applying the pre-formed mating member to at least one of the first and second portions.

7. The method as set forth in claim 1, wherein the housing is welded together at the seam prior to step of opening the housing.

8. The method as set forth in claim 1, wherein the interior component comprises at least one of a trigger, a drive assembly, a gear, a shaft, and a slider.

9. The method as set forth in claim 1, wherein the step of applying the pre-formed mating member to the housing comprises applying the pre-formed mating member to the housing adjacent the seam.

10. A method of reprocessing a surgical instrument, the surgical instrument comprising a housing defining a cavity and at least one interior component disposed within the cavity, the method comprising the steps of:
- opening the housing along a seam to separate the housing into a first housing component and a second housing component and access the cavity;
- servicing the at least one interior component;
- applying a pre-formed mating member to at least one of the first housing component and the second housing component; and
- coupling the first housing component and the second housing component with the pre-formed mating member after the step of servicing.

* * * * *